United States Patent Office 2,827,486
Patented Mar. 18, 1958

2,827,486

MANUFACTURE OF FLUORINATED SALTS AND ACIDS

Charles B. Miller and Cyril Woolf, Morristown, N. J., assignors to Allied Chemical & Dye Corporation, New York, N. Y., a corporation of New York No Drawing. Application March 14, 1955
Serial No. 494,274

11 Claims. (Cl. 260—539)

This invention is directed more particularly to manufacture of ammonium trihaloacetates wherein at least one of the halogens is fluorine and any remaining halogen is chlorine, and also to production of the corresponding trihaloacetic acids. The invention comprises methods for making especially $CFCl_2.CO.ONH_4$, $CF_2Cl.CO.ONH_4$, $CF_3.CO.ONH_4$, and also $CFCl_2.COOH$, $CF_2Cl.COOH$, and $CF_3.COOH$.

Major objects of the invention lie in provision of methods for making the foregoing products using certain perchlorofluoracetones as starting materials, and in provision of procedures which effect high yields of major sought for products and minimize formation of certain less desirable by-products.

Ketones which may be employed as starting materials in the practice of the invention are perchlorofluoroacetones containing one to 4 inclusive fluorine atoms per mol, and containing a radical of the group consisting of —$CCl_3$ and $CCl_2F$. Starting materials particularly adapted for use are $CFCl_2.CO.CCl_3$ (B. P. 163–166° C.), $CFCl_2.CO.CFCl_2$ (B. P. 118–122° C.), $CF_2Cl.CO.CCl_3$ B. P. 120° C.), $CCl F_2.CO.CCl_2F$ (B. P. 84.2° C.), $CF_3.CO.CCl_3$ (B. P. 83.5–84.5) and $CF_3.CO.CFCl_2$ (B. P. 44° C. Under ordinary conditions all of these compounds are substantially colorless liquids. In general, certain of such compounds may be made for example by effecting reaction between hexachloroacetone and anhydrous HF or other fluorinating agent at moderately elevated temperature while in the presence of antimony pentahalide and while maintaining the reaction mass substantially in the liquid phase, and thereafter recovering the particular perchlorofluoroacetone from the reaction products by suitable procedure such as distillation. Certain other organic starting compounds may be made by reacting certain perchlorofluoroacetones with aluminum chloride and recovering such compounds from reaction products by suitable distillation. Hereinbelow Examples A–F are illustrative of methods for making the perchlorofluoroacetone materials there noted. Manufacture of perchlorofluoroacetones and processes for making the same are discussed in greater detail and claimed in our copending applications Serial Nos. 494,237 and 494,238, filed March 14, 1955 (respectively continuations-in-part of our applications Serial Nos. 411,028 and 411,027, filed February 17, 1954, now abandoned).

In accordance with the present invention, it has been found that the ammonium trihaloacetates under consideration may be made from the described fluoro ketones containing the indicated trihalomethyl groups adjacent to the carbonyl unit principally by alkaline scission resulting in the formation of an ammonium salt and conversion of the trihalomethyl group to a haloform.

Procedurally, practice of the invention in the broader aspects involves treatment of the hereindefined perchlorofluoroacetones with water and ammonia ($NH_3$) to produce ammonium trihaloacetates as one group of products of the invention. If the corresponding acids are desired, such acids can be made by acidification of the ketone-water-ammonia reaction products followed by isolation and recovery of the acids. Within the hereindescribed quantities, water and ammonia may be used in any form, e. g. the ammonia may be gaseous. Ordinarily, in general practice of the invention processes, the perchlorofluoroacetone starting material is reacted at relatively low temperature with water and ammonia as aqueous ammonium hydroxide solutions of certain $NH_3$ strengths.

Our prior investigations and those on which the present development is based indicate that in operations of the type under consideration, i. e. reaction between the indicated perchlorofluoroacetones and alkaline agents, reactions may take place simultaneously along two courses. In the reactions of both courses, the same ammonium trihaloacetate, wherein at least one of the halogens is fluorine and any remaining halogen is chlorine, is formed. The process of our present improvements is dominated by one reaction illustrated in accordance with Equation A

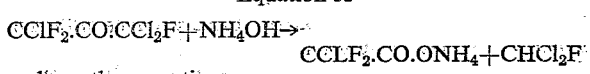

and another reaction

Equation B $CClF_2.CO.CCl_2F + 4NH_4OH \rightarrow$
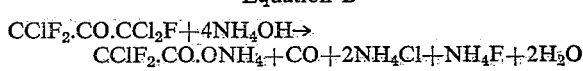

tends to take place to some extent. Reaction of Equation A is characterized by alkaline scission of the $CCl_2F$ radical, while reaction of Equation B is characterized by halogen attack on or decomposition of at least some of the $CCl_2F$ radical, resulting in formation of $CO$, $NH_4Cl$, $NH_4F$ and $H_2O$ as by-products. A major object of the present improvements is to drive the reaction along the course of Equation A, and minimize reaction along the course of Equation B.

In practice of the invention, assuming use of water and ammonia in the form of an aqueous ammonium hydroxide, the ketone may be added to the ammonium hydroxide contained in a suitable reaction vessel. Agitation and external cooling in the reaction vessel facilitate removal of reaction heat. Alternatively, the ammonium hydroxide may be added to the ketone. The ketone may, if desired, be diluted with e. g. 1 to 3 mols of water per mol of ketone prior to reaction to dissipate heat of hydration, although the reaction takes place rapidly and by the same courses without water dilution. In preferred embodiments, the ammonia and water are utilized in the form of water solutions of hereinafter discussed $NH_3$ strengths.

During mixing or incorporation of the perchlorofluoroacetone and the ammonium hydroxide, temperatures in the reaction vessel are maintained not in excess of about 35° C. i. e. to maintain liquid phase. In the more usual practice, temperatures are maintained in the range of about minus 10° C. to 20° C. In some instances, subsequent to completion of mixing or incorporation of the perchlorofluoroacetone and the ammonium hydroxide and subsidence of initial reaction heats, for the purpose of effecting completion of reaction, temperature of the mass in the reaction vessel may be raised e. g. by external heating to as high as about 100° C.

In practice, during the course of the reaction, depending upon the particular ketone employed as starting material, the haloforms $CHCl_3$ (B. P. 62° C.) or $CHCl_2F$ (B. P. 8.9° C.) are produced. The haloform $CHCl_2F$, under best working conditions, distills out from the reaction vessel, and may be collected by any suitable means such as cooling by use of Dry-Ice traps. If the ketone starting material employed is such that chloroform is produced, on completion of the ketone hydroxide reaction, the chloroform may be distilled out of the mass in the reaction vessel or the reaction mass may be permitted to separate into a chloroform phase, and a liquid phase containing the ammonium trihaloacetate in aqueous solution. Where reaction conditions are such that some halogen attack on ketone takes place and some $NH_4Cl$, $NH_4F$, $H_2O$ and CO are formed, CO passes off as a gas, while the other three by-products remain in the reaction mass.

When carrying out the invention, under all conditions of operation, reactions proceed to a dominant extent as exemplified by Equation A, and simultaneously to some considerably lesser extent as illustrated by Equation B. In each instance, the same ammonium haloacetate is produced, although in the one case the more valuable haloform by-product is formed, while in the other circumstance the less desirable and valuable by-products $NH_4Cl$ and $NH_4F$ are produced. Principal invention objective and accomplishments are provision of control conditions by which reaction along the lines of Equation A heavily predominates, i. e. regulation of the reaction so as to produce the ammonium trihaloacetate together with the more valuable haloform, and to decrease to the extent feasible formation of the less valuable non-haloform reaction products of equation B. In accordance with the invention, it has been found minimization of non-haloform by-product formation may be effected by control of three reaction conditions, namely, temperature, use of $NH_3$ as the scission effecting reactant, and the concentration in which the ammonia is used.

In general, temperature conditions are as stated above. However, to promote completion and the course of reaction toward haloform production the lower temperatures are preferred. Particularly during incorporation of the ketone and ammonium hydroxide, temperature should not be above about 35° C., and preferably somewhere in the range of minus 10 up to e. g. 10° C. These temperature conditions are especially applicable during incorporation of the ketone and the ammonium hydroxide, after the accomplishment of which the higher temperatures above noted may be utilized if desired to promote completion of reaction.

In accordance with a major feature of the invention, it has been found that ammonia, used in aqueous form, is primarily a scission effecting reactant, and inherently promotes scission reaction (Equation A), prevents formation of perhaloacetamides, and depresses halogen attack or decomposition (Equation B). This discovery affords the major advantage of minimizing production of non-haloform by-products. Further, use of aqueous ammonia facilitates purity of product (absence of amides), and employment of a less overall quantity of water as compared with other alkaline reagents, which latter feature thus affords the advantage of ultimate recovery of acetate or corresponding acid from a reaction mass of relatively small bulk.

Moreover, we find that another major factor involved in directing dominance of reaction along the course of Equation A is the $NH_3$ concentration in which the aqueous ammonia is employed, as distinguished from the overall quantity of ammonia introduced into the reaction. Aside from supplying to the operation at hand a total quantity of ammonia sufficient to effect satisfactory conversion of the ketone starting material, and completion of reaction, the quantity of ammonia used is not of first importance with regard to regulating dominance of reaction along the desired course. For best conversion of ketone starting material and completion of reaction, it is preferred to use an excess of ammonia, generally between 1.4 to 2 mols of $NH_3$ per mol of ketone.

We have found that when the $NH_3$ concentration of the water solution of ammonia as charged into the reaction is relatively low, the scission reaction of Equation A is promoted and that halogen attack or decomposition of one radical of the ketone is depressed. The aqueous ammonia solutions employed in practice of the invention are water solutions of ammonia containing at least one mol of $H_2O$ per mol of $NH_3$. Aqueous solutions of such maximum $NH_3$ concentration, effect scission reaction and also prevent amide formation. In the more preferred aspects, water and ammonia are incorporated with ketone, the ammonia being in amount such that ammonia and total water in the reaction mass are present in quantity equivalent to a water solution of ammonia having an $NH_3$ concentration not in excess of 30% by weight, and preferably in the range of 20–30%. We find that, by so proceeding, halogen attack on the ketone may be limited to about 15% or less, i. e. less than about 15% of the total ketone starting material reacts in accordance with Equation B with resultant formation of the less desirable by-products.

As shown above and demonstrated by appended examples illustrating practices of the invention, the processes described involve reactions proceeding simultaneously by two routes, i. e. scission, and decomposition to some extent. Unexpected features of our investigations comprise the discoveries that perchlorofluoroacetones and ammonia yield the ammonium salt and not the expected perhaloacetamides, and that notwithstanding the presence of dual reactions, each reaction produces the same ammonium trihaloacetate. Further, we have found that, regardless of permissible variability of reaction conditions, when an asymmetric (with respect to fluorine) perchlorofluoroacetone is used as starting material, the reaction product does not contain a mixture of e. g.

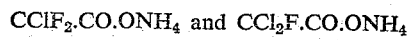
$CClF_2.CO.ONH_4$ and $CCl_2F.CO.ONH_4$ but there is formed only a single acetate salt which contains fluorine atoms in number equal to the number of fluorine atoms present in the perhaloalkyl radical having the highest number of fluorine atoms. This major advantage afforded by the invention is well shown by an operation such as exemplified by above Equations A and B in which the reaction product contains no

$CCl_2F.CO.ONH_4$ and the acetone salt product formed contains two fluorine atoms, which fluorine content corresponds with the $CClF_2$ radical of the ketone rather than with the $CCl_2F$ radical. Hence, in practice of the invention preferred starting materials are the asymmetric perchlorofluoroacetone compounds, the more preferred starting materials being

$CFCl_2.CO.CCl_3$, $CF_2Cl.CO.CCl_3$ and $CF_3.CO.CCl_3$

Moreover, we have found also that, to the extent reaction unavoidably takes the course of Equation B, haloalkyl decomposition is effected on the alkyl radical containing no fluorine or the fewer number of fluorine atoms.

On completion of reaction, the particular ammonium trihaloacetate is present in solution in the reaction liquor. To recover any acetate salt as a product, fluoride ion may be precipitated by addition of $CaCl_2$, filtering, and evaporating the filtrate to dryness under reduced pressure. The crushed mixture of $NH_4Cl$ and e. g.

$CClF_2.CO.ONH_4$ may be leached with 95% ethyl alcohol in which the very soluble $CClF_2.CO.ONH_4$ dissolves. The filtered alcohol extract may then be evaporated to dryness under subatmospheric pressure.

If the trihaloacetic acid corresponding to a particular ammonium trihaloacetate salt is desired as the end product, such acid may be isolated from the ketone-ammonium reaction product subsequent to acidification by a strong acid. Sulfuric acid is the most suitable liberating acid, although other strong acids such as phosphoric and hydrochloric may be employed if desired. Sulfuric acid may be added in amount such that one or more mols of free $H_2SO_4$ is present per mol of water present, and the perhaloacetic acid may be distilled therefrom together with any HCl and/or HF liberated. Reflux conditions may be adjusted so that the HCl and/or HF are discharged from the distillation system as gases. Alternatively, about one mol of $H_2SO_4$ per mol of $NH_3$ initially used may be added to the reaction mass, and the perhaloacetic acid extracted with a suitable solvent such as benzene or chloroform. The extract may be dried for example by azeotropic distillation in which all of the water and some of the benzene is distilled off as overhead. The residual perhaloacetic acid-benzene liquid then may be fractionally distilled to recover the perhaloacetic acid in pure form.

Following Examples A–F illustrate methods for making certain hereindescribed perchlorofluoroacetones:

*Example A.—Manufacture of $CFCl_2CO.CCl_3$.*—530 grams of hexachloroacetone and 30 grams of $SbCl_5$ were charged to a reactor. The total of organic starting material and antimony pentahalide charged contained about 5 mol percent of the latter. The mass was gassed with HF for about 8 hours at temperature of about 110° C. until 1.6 mols of HCl had been formed. The reaction product was washed with small portions of 20 weight percent HCl to remove antimony halide, dried, and fractionated to recover 420 grams $CCl_3.CO.CCl_2F$, B. P. 163–166° C.

*Example B.—Manufacture of $CFCl_2.CO.CFCl_2$.*—260 grams of hexachloroacetone, 23 grams (10 cc.) of $SbCl_5$, and 360 grams of $SbF_3$, were heated in a reactor at temperature of about 140° C. and refluxed for 30 minutes. The total of organic starting material and antimony pentahalide charged contained about 7 mol percent of the latter. The reaction product was cooled, and the supernatant product decanted from unreacted fluorinating agent and catalyst. Fractional distillation resulted in recovery of 110 grams of $CCl_2F.CO.CCl_2F$, B. P. 118°–122° C., together with some higher fluorinated acetones.

*Example C.—Manufacture of $CF_2Cl.CO.CCl_3$.*—400 grams of liquid, substantially colorless $CClF_2.CO.CClF_2$ (B. P. 44° C. and made e. g. as in Example D.) were mixed with 60 grams of anhydrous, powdered $AlCl_3$ in a reactor provided with a reflux condenser regulated to effect total refluxing of the evolved vapors. Reaction was exothermic and refluxing spontaneously occurred. Without application of external heat, exothermic heat maintained continuance of reaction for about an hour, after which refluxing subsided. Substantially all of the liquor in the reactor was then distilled away from the aluminum halides, and the total condensate thus recovered was fractionated. Some unreacted

$CClF_2.CO.CClF_2$ (B. P. 44° C.) starting material was boiled off as heads and recovered. Thereafter, an overhead having a vapor temperature of about 120° C. distilled over, and 76 grams of a substantially colorless liquid identified as

$CClF_2.CO.CCl_3$ and having a boiling point of 120° C. were recovered.

*Example D.—Manufacture of $CF_2Cl.CO.CFCl_2$, $CF_2Cl.CO.CClF_2$, and $CF_3.CO.CClF_2$.*—360 grams of $SbF_3$, 300 grams of $SbCl_5$, and 264 grams of hexachloroacetone were heated in a reactor the exit of which was connected with a fractionating still. The total of organic starting material and antimony pentahalide charged contained about 50 mol percent of the latter. Reaction was allowed to proceed at temperature of 105°–110° C. for 2 hours, and then the product was distilled out during 3 hours until the still pot temperature reached 190° C. Refractionation of product yielded mainly

$CCl_2F.CO.CClF_2$,

B. P. 84.2° C. (133 g.=62% yield); $CClF_2.CO.CClF_2$, B. P. 44° C. (59 g.=29% yield); and $CF_3.CO.CClF_2$, B. P. 7–11° C. (6 g.=4% yield).

*Example E.—Manufacture of $CF_3.COCCl_3$.*—183 grams of liquid, substantially colorless $CF_3.COCClF_2$ (B. P. 7–11° C. and made e. g. as in Example D) were slowly dripped during a period of about 4 hours into a flask containing 100 grams of anhydrous powdered $AlCl_3$. The flask was immersed in an oil bath maintained at 60° C., and was connected to an ice-cooled reflux condenser. Subsequent to addition of the ketone, reflux was continued for an additional 6 hours with increased reactor temperature up to about 75° C. Then substantially all of the liquid contents of the flask were distilled away from the aluminum halides. The resulting condensate was fractionated. Some unreacted

$CF_3.CO.CClF_2$ starting material was boiled off as heads and recovered. Thereafter, an overhead having a vapor temperature of about 83–85° C. distilled over, and 120 grams of substantially colorless liquid identified as $CF_3.CO.CCl_3$ and having a boiling point of about 83.5–84.5° C. were recovered.

*Example F.—Manufacture of $CF_3.CO.CCl_2F$.*—120 grams of liquid, substantially colorless $CF_3.CO.CCl_3$ (B. P. 83.5–84.5° C. and made e. g. as in Example E), 100 grams of $SbF_3$ and 93 grams of $SbCl_5$ were charged into a reactor connected to a fractionating column and a reflux condenser. The total of organic starting material and antimony pentahalide charged contained about 36 mol percent of the latter. The mass in the reactor was heated at temperature of about 95–100° C. Reflux conditions were adjusted so as to effect slow discharge from the reflux condenser of a fraction boiling at about 43–46° C. This condensate was redistilled, and 70 grams of substantially colorless liquid identified as $CF_3.CO.CCl_2F$ and having a boiling point of about 44° C. were recovered.

The following examples are illustrative of practice of the invention:

*Example 1.*—One mol of $CCl_2F.CO.CCl_3$ (B. P. 163–166° C.) was slowly added while agitating to 1.6 mols of $NH_3$ in the form of a 20 weight percent aqueous solution of ammonia over a period of about 60 minutes. During incorporation of the aqueous ammonia solution, the reacting mass was maintained at temperature of about zero to 5° C. Subsequent to addition of the ammonia solution, the mixture was heated to about 40° C. for about 2 hours to effect completion of reaction. The reaction mass was cooled to about 25° C., permitted to settle, and about 0.92 mol of $CHCl_3$ was separated from the reaction mixture by decantation. In this run about 8% of the original ketone, which had reacted, had been subjected to halogen attack or decomposition, resulting in the formation of by-products other than the haloforms, such as CO, $NH_4Cl$, $NH_4F$, and $H_2O$ as indicated by Equation B. The reaction product containing

$CCl_2F.CO.ONH_4$ in solution was treated with about 1.6 mols of 100% $H_2SO_4$ in the form of 96% strength sulfuric acid. About 300 cc. of benzene were added to extract the

$CCl_2F.COOH$

The extract was dried by azeotropic distillation of some of the benzene and all of the water present, and the dried benzene-$CCl_2F.COOH$ extract was fractionally distilled to recover 0.96 mol of $CCl_2F.COOH$ (B. P. 121° C.) as overhead; yield 96%, basis theory.

*Example 2.*—One mol of $CCl_2F.CO.CCl_2F$ (B. P. 118–122° C.) was added while agitating to 1.6 mols of $NH_3$ in form of a 28% water solution of ammonia over a period of about one hour. During addition of the perchlorofluoroacetone, temperature of the mass in the reaction vessel was maintained at about 0° C. After incorporation of the perchlorofluoroacetone, the mass in the reaction vessel was heated to about 45° C. for a period of about 60 minutes. About 0.86 mol of CHCl$_2$F (B. P. 8.9° C.) were evolved in the course of the reaction, and were recovered in a Dry Ice trap. Halogen attack on the ketone starting material amounted to about 14%. About 1.6 mols of 100% H$_2$SO$_4$, as a 96% sulfuric acid solution, were added to the mass in the reaction vessel, which prior to the sulfuric acid addition, contained CCl$_2$F.CO.ONH$_4$ in solution. Similarly as in Example 1, the CCl$_2$F.COOH formed by acidification, was benzene extracted, the extract dried, and the quantity of CCl$_2$F.COOH recovered on final fractional distillation was 0.92 mol; yield 92% on the basis of theory.

*Example 3.*—A 20% water solution of ammonia containing 1.6 mols of NH$_3$ was stirred and maintained at a temperature of about 0–5° C. while adding thereto one mol of CClF$_2$.CO.CCl$_3$ (B. P. 120° C.) over a period of about 60 minutes. Temperature of the mass in the reactor was then raised to about 40° C. for about 2 hours to facilitate completion of reaction. The liquid phases formed on settling of the mass in the reaction vessel were separated, and 0.9 mol of CHCl$_3$ were recovered. Halogen attack on the ketone starting material was about 10%. The remaining aqueous phase, containing

CClF$_2$.CO.ONH$_4$ in solution, was acidified by addition of about 1.6 mols of 100% H$_2$SO$_4$ as 96% sulfuric acid. CClF$_2$.COOH was extracted from acidified liquor with benzene as in Example 1, and on final fractional distillation 0.97 mol of CClF$_2$.COOH (B. P. 121° C.) was recovered as overhead; yield 97% on the basis of theory.

*Example 4.*—18 g. of water were added to one mol of CClF$_2$.CO.CCl$_2$F (B. P. 84.2° C.). This aqueous mixture, cooled to about 25° C., was added during a period of about one hour to 1.6 mols of NH$_3$ as a 28% water solution of ammonia. Total water and NH$_3$ were present in amount equivalent to a water solution of ammonia having an NH$_3$ concentration of about 23% by weight. During incorporation of the perchlorofluoroacetone, temperature of the reaction mass was maintained at about 0°–5° C. The reaction mixture was then heated to about 50° C. for 2 hours. About 0.85 mol of CHCl$_2$F (B. P. 8.9° C.) were evolved and collected in a Dry Ice trap. Halogen attack on the ketone amounted to about 15%. The aqueous solution, remaining in the reaction vessel and containing CClF$_2$.CO.ONH$_4$, was acidified with about 1.6 mols of 100% H$_2$SO$_4$ as a 96% sulfuric acid solution. Following benzene extraction, azeotropic removal of water and distillation similarly as in Example 1, 0.95 mol of CClF$_2$.COOH were recovered; yield, about 95% on the basis of theory.

*Example 5.*—320 g. of 28% water solution of ammonia, containing 5.25 mols of NH$_3$, were added during three hours to 1130 g. (5.25 mols) of CClF$_2$.CO.CCl$_2$F. During incorporation of reactants, the mass in the reaction vessel was maintained at 20–30° C. The temperature was then raised to 90° C. to effect completion of reaction. All ammonia was consumed, and 3.20 mols of CHCl$_2$F were evolved and recovered in a Dry Ice trap. Analysis of the aqueous product, containing ammonium difluorochloroacetate, showed the presence of 0.51 mol NH$_4$F and 1.02 mols NH$_4$Cl; indicating that 3.71 mols of ketone starting material had reacted, i. e. that 0.51 mol of ketone had been subjected to halogen attack while 3.20 mols of ketone had been subjected to scission reaction producing acetate and haloform. After acidifying with 5.9 mols 100% H$_2$SO$_4$, as 600 g. of 96% sulfuric acid, extracting with benzene, drying, and distilling as in Example 1, 3.67 mols of CClF$_2$.COOH were recovered along with the unreacted ketone. On the basis of ketone reacted, CClF$_2$.COOH yield was 99%, and halogen attack was about 14%.

*Example 6.*—One mol of CF$_3$.CO.CCl$_2$F (B. P. 44° C.) was diluted with 36 g. of water, and this mixture was added to 1.6 mols of NH$_3$ in the form of a 28% aqueous solution of ammonia over a period of about 60 minutes. Total water and NH$_3$ were present in amount equivalent to a water solution of ammonia having an NH$_3$ concentration of about 20% by weight. During incorporation of the perchlorofluoroacetone, the mass in the reactor was maintained at temperature of about 0–5° C. For a succeeding period of about one hour the temperature of the mass in the reactor was raised to about 35° C. In the course of reaction, about 0.85 mol of CHCl$_2$F (B. P. 8.9° C.) were evolved and recovered in a Dry Ice trap. Halogen attack on the ketone starting material was about 14%. The aqueous solution remaining in the reactor, containing CF$_3$.CO.ONH$_4$, was acidified with 8 mols 100% H$_2$SO$_4$, 400 cc. of 96% sulfuric acid. After benzene extraction, drying, and fractional distillation similarly as in Example 1, 0.95 mol of CF$_3$.COOH (B. P. 71–73° C.) were recovered; yield, about 95%, on basis of theory.

*Example 7.*—10.25 mols (54 g.) of CF$_3$.CO.CCl$_3$ (B. P. 83.5–84.5° C.) were mixed with cooling with 5 g. of water. To this mixture, cooled in an ice bath, was slowly added 0.37 mol of NH$_3$ in the form of 27% aqueous ammonia over a period of about 30 minutes. During incorporation of the aqueous ammonia, the reaction mass was maintained at a temperature of about 10–15° C. After the ammonia solution had been added, temperature was raised to about 50° C. and maintained at that point for about an hour to facilitate completion of reaction. The reaction mass containing CF$_3$.CO.ONH$_4$ in solution, after cooling to about room temperature, was treated by slow addition of 250 g. of 96% sulfuric acid. Chloroform and CF$_3$.COOH were distilled out, and fractionation of the crude condensate thus obtained gave 26 g. (90% of theory) of CF$_3$.COOH, (B. P. 71–73° C.) and 26 g. of CHCl$_3$ (85% of theory).

*Example 8.*—1.6 mols of NH$_3$ as a 28% water solution, were added during a period of about 1 hour to a cooled mixture of 36 g. of water and one mol of CClF$_2$.CO.CCl$_2$F (B. P. 84.2° C.). During incorporation of the ammonia solution, temperature of the reacting mass was maintained at about 10° C. Temperature was then raised to about 50° C. for about an hour to facilitate completion of reaction. During heating, about 0.85 mol of CHCl$_2$F was evolved and recovered. To the thus obtained aqueous reaction product, 8.8 g. of CaCl$_2$ dissolved in 20 g. of water were added, and the CaF$_2$ formed was filtered out. The filtrate was evaporated to dryness at subatmospheric pressure, crushed, and leached twice with 150 g. each cycle of 95% ethyl alcohol. The filtered extract was evaporated to dryness under subatmospheric pressure, and 132 g. (90% of theory) of CClF$_2$.CO.ONH$_4$ were obtained.

The hereindescribed fluorochloro acids are known in the art. The mono and tri fluoro acids are suitable for use as esterification catalysts, and the mono and di fluoro acids constitute effective solvents for cellulose.

We claim:

1. The process which comprises mixing (1) a perchlorofluoroacetone containing one to 4 fluorine atoms and containing a radical of the group consisting of —CCl$_3$ and —CCl$_2$F, (2) water in amount at least one molecular proportion per mol of perchlorofluoroacetone, and (3) ammonia in amount not more than one molecular proportion per mol of water present; and maintaining temperature not in excess of about 35° C. during said mixing, thereby to form ammonium trihaloacetate wherein at least one of the halogens is fluorine and any remaining halogen is chlorine.

2. The process of claim 1 in which the perchlorofluoroacetone is asymmetric.

3. The process of claim 1 in which the perchlorofluoroacetone contains a trichloromethyl group.

4. The process which comprises mixing (1) a perchlorofluoroacetone containing one to 4 fluorine atoms and containing a radical of the group consisting of —CCl$_3$ and —CCl$_2$F, (2) water in amount at least one molecular proportion per mol of perchlorofluoroacetone and (3) ammonia in amount not more than one molecular proportion per mol of water present; and maintaining temperature during said mixing low enough to effect a substantially liquid phase reaction, thereby to form ammonium trihaloacetate wherein at least one of the halogens is fluorine and the other remaining halogen is chlorine.

5. The process which comprises mixing (1) a perchlorofluoroacetone containing one to 4 fluorine atoms and containing a radical of the group consisting of —$CCl_3$ and —$CCl_2F$, (2) water, and (3) ammonia, the ammonia being in amount such that ammonia and total water are present in quantity equivalent to a water solution of ammonia having an $NH_3$ concentration not in excess of 30% by weight, and maintaining temperature not in excess of about 35° C. during said mixing, thereby to form ammonium trihaloacetate wherein at least one of the halogens is fluorine and any remaining halogen is chlorine.

6. The process of claim 5 in which the perchlorofluoroacetone is asymmetric.

7. The process of claim 5 in which the perchlorofluoroacetone is $CCl_2F.CO.CCl_3$, thereby to form $CCl_2F.CO.ONH_4$.

8. The process of claim 5 in which the perchlorofluoroacetone is $CClF_2.CO.CCl_3$, thereby to form $CClF_2.CO.ONH_4$.

9. The process of claim 5 in which the perchlorofluoroacetone is $CF_3.CO.CCl_3$, thereby to form $$CF_3.CO.ONH_4.$$

10. The process which comprises mixing (1) a perchlorofluoroacetone containing one to 4 fluorine atoms and containing a radical of the group consisting of —$CCl_3$ and —$CCl_2F$, (2) water, and (3) ammonia, the ammonia being in amount such that ammonia and total water are present in quantity equivalent to a water solution of ammonia having an $NH_3$ concentration not in excess of 30% by weight, and maintaining temperature not in excess of about 35° C. during said mixing, thereby to form ammonium trihaloacetate wherein at least one of the halogens is fluorine and any remaining halogen is chlorine, acidifying the resultant reaction mass to convert the ammonium trihaloacetate salt to the corresponding trihaloacetic acid, and recovering said acid.

11. The process of claim 10 in which the perchlorofluoroacetone is asymmetric; and the $NH_3$ is utilized in amount in the range of about 1.4–2 proportions per mol of perchlorofluoroacetone, and temperature is substantially in the range of minus 10° C. to 10° C.

References Cited in the file of this patent

UNITED STATES PATENTS

| | | |
|---|---|---|
| 2,480,467 | Haworth et al. | Aug. 30, 1949 |
| 2,695,918 | Gilbert et al. | Nov. 30, 1954 |

OTHER REFERENCES

Zincke et al.: Ber., 21, 2728 (1888).
Whitmore: Organic Chemistry, 2nd ed., 1951, p. 275.